United States Patent [19]

De Groot

[11] Patent Number: 4,500,371
[45] Date of Patent: Feb. 19, 1985

[54] HEAT-RECOVERABLE ARTICLE

[75] Inventor: Hubert De Groot, Duisburg, Belgium

[73] Assignee: N.V. Raychem S.A., Kessel-lo, Belgium

[21] Appl. No.: 580,050

[22] Filed: Feb. 14, 1984

[30] Foreign Application Priority Data

Feb. 14, 1983 [GB] United Kingdom ............ 8304027

[51] Int. Cl.³ .................. H01B 13/06; B32B 31/26
[52] U.S. Cl. ............................ 156/48; 156/49;
156/52; 156/86; 174/118; 174/DIG. 8; 428/36;
428/910; 428/913
[58] Field of Search ............ 156/48, 49, 52, 84,
156/85, 86; 174/118, 121 R, DIG. 8; 428/36,
188, 222, 910, 913

[56] References Cited

U.S. PATENT DOCUMENTS

| 4,237,609 | 12/1980 | Clabburn et al. | 156/86 X |
| 4,390,745 | 6/1983 | Böttcher et al. | 428/36 X |
| 4,409,426 | 10/1983 | Nolf et al. | 174/21 R |
| 4,431,861 | 2/1984 | Clabburn et al. | 29/859 X |
| 4,448,824 | 5/1984 | Holmes et al. | 156/86 X |
| 4,450,871 | 5/1984 | Sato et al. | 428/36 X |

FOREIGN PATENT DOCUMENTS 1603298 11/1981 United Kingdom.

Primary Examiner—Robert Dawson
Attorney, Agent, or Firm—T. Gene Dillahunty; Herbert G. Burkard

[57] ABSTRACT

An article for forming a cable block or for enclosing a cable splice comprises a recoverable driver sleeve and a particulate heat-activatable adhesive temporarily restrained adjacent an inner surface of the sleeve.

15 Claims, 6 Drawing Figures

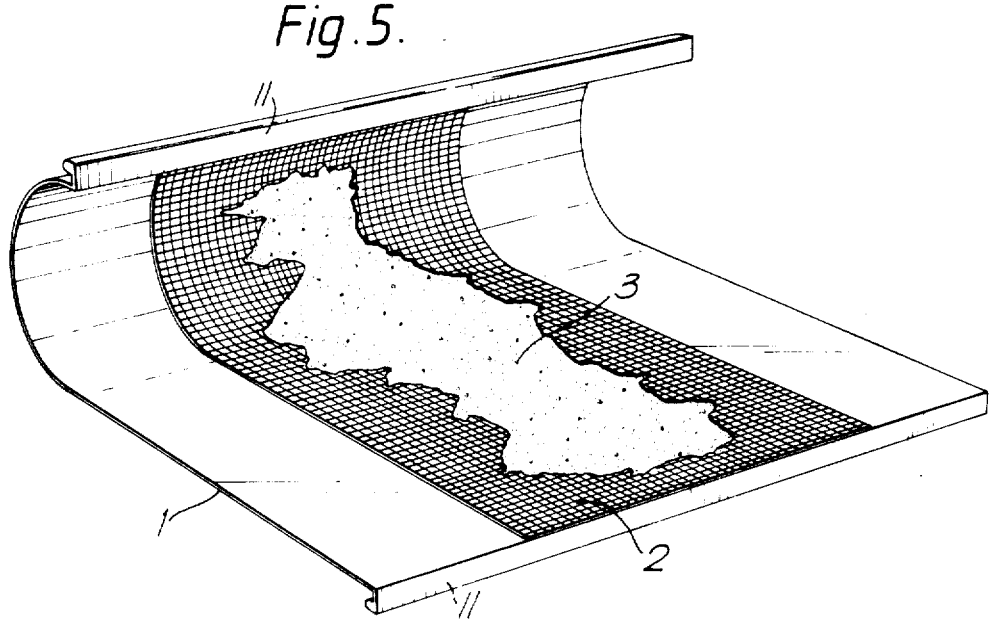
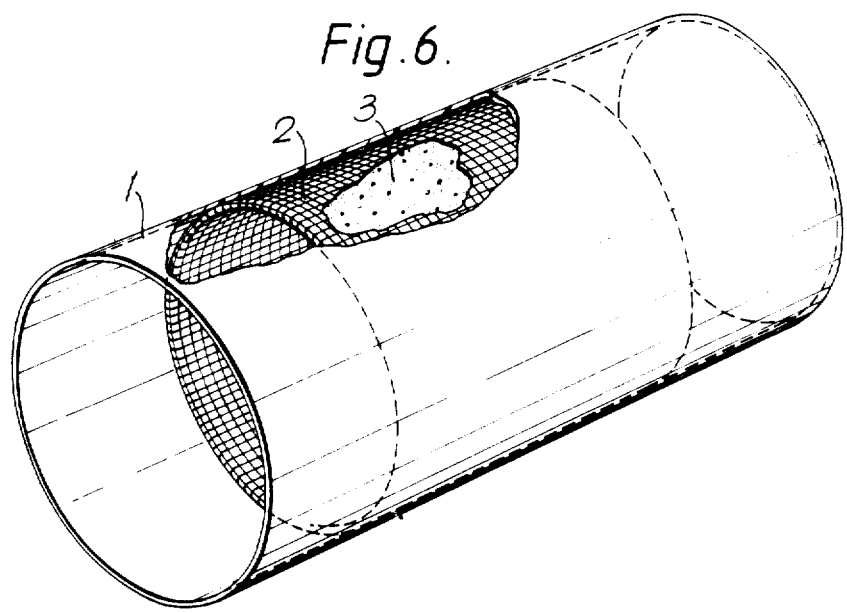

4,500,371

HEAT-RECOVERABLE ARTICLE

DESCRIPTION

This invention relates to a heat-recoverable article for protecting or blocking elongate substrates such as cables, joints in cables or pipes.

In general such substrates can be protected from the environment or blocked by building some sort of casing around them which holds in place a sealing material, for example a hot-melt adhesive or a mastic. It is desirable that this casing be tightly fitting, installable with ease and able to accommodate a wide variety of sizes of substrates, and for these reasons recoverable sleeves have found wide use. A recoverable sleeve can be installed by a simple treatment such as heating, a large force on recovery ensures tight sealing to the underlying substrate, and the high recovery ratios that are attainable allow a single design to be used over a wide range of substrates.

Heat-recoverable articles, whose dimensional configuration may be made substantially to change when subjected to heat treatment, usually recover towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, equivalent to U.S. Patent 4,035,534 an elastomeric member such as an outer tubular member is held in a stretched state by a second member, such as an inner tubular member, which, upon heating weakens and thus allows the elastomeric member to recover.

An example of the use of a heat-recoverable articles for cable blocking (by which we mean the prevention of passage of a fluid along the inside of a cable) is to be found in German Patent specification No. 2539325 (Kabel-und Metallwerke). A pressurised communications cable is blocked by removing a band of cable jacket and installing around the exposed part of the cable a heat-recoverable tube, the ends of which are shrunk down onto the cable jacket either side of the exposed part. This first step provides a container sealed around the exposed part of the cable into which one pours a casting resin. The resin flows between the conductors to a certain extent, but it is the final step of shrinking down the central part of the container which drives the resin along the cable core forming an excellent cable block. This system produces good results but requires careful sealing of the hole through which the resin was introduced, and the use of a separate liquid component makes the technique somewhat craft-sensitive in certain applications.

The use of a liquid is avoided in the method disclosed in UK Patent specification No. 1603298 (N. V. Raychem SA) equivalent to U.S. Patent 4,195,106. This method, which is particularly applicable for blocking telecommunications cables of up to 20 pairs, makes use of a recoverable sleeve having a hot-melt adhesive insert (generally a tube coaxial with the sleeve) and, positioned between these two components, a heat barrier layer such as a tubular net. The article is used as described above to surround the conductors of a cable at a discontinuity in the cable jacket. The heat barrier, which should be capable of preserving its structural integrity during installation of the product, allows through sufficient heat to melt the adhesive but insufficient to damage the cable.

This article also produces good results but it can have disadvantages when used with larger cables. We believe that the large inner adhesive layer required on a large sleeve can be difficult to melt under unfavourable conditions, causing leak paths to remain in the installed product. If further heat is applied in an attempt to overcome this problem, cable damage or sleeve splitting may occur. (Large adhesive coated sleeves can of course be used as mere protective coverings where a small amount only of adhesive is required for bonding, rather than the larger amount required for void-filling.)

Thus, the present invention provides an assembly for applying a heat-activatable adhesive to an elongate substrate, which comprises:

a heat-recoverable driver sleeve;
a particulate heat-activatable adhesive; and
means for mechanically locating the adhesive adjacent an inner surface of the sleeve until heat-recovery of the sleeve.

The means by which the particulate adhesive is maintained in place is mechanical, which excludes an arrangement where a layer of particulate adhesive is bonded, by press-coating or otherwise, to a recoverable sleeve. In general, the amount of adhesive present will greatly exceed that amount which could be accommodated thus as one coating and, in such a situation, the particles nearest the sleeve may be bonded but the remainder will be mechancially maintained.

The invention also provided a method of blocking a cable, which comprises:

surrounding with an assembly of the invention a portion of the cable having an intermediate portion at least partially bare of jacket; and heating the assembly causing the sleeve to recover and the adhesive to become activated, recovery causing the adhesive to be driven into the core of the cable and respective end portions of the sleeve to engage the cable jacket at each side of the bare portion.

The invention further provides a method of environmentally sealing a cable splice which comprises using the assembly in an analogous way over the splice; here, however, it is not necessary that the adhesive permeate the cable core since an external coating (around the conductors or around a superimposed liner) is all that is required.

The assembly of the invention may also be used to cover pipes or joints in pipes.

Before the three components of the assembly are individually disscused, a preferred form of the complete article will be described.

If the assembly of the invention is to be used to form a cable block, or to seal a splice without the use of a liner, the amount of adhesive required will be larger than that required simply to bond a sleeve to an underlying surface. The amount of adhesive required can easily be determined by the skilled worker by measuring the cable or splice diameter and the volume of conductors to be contained. Where a cable block is being constructed, some assessment will need to be made of adhesive flow along the cable core. The length of the recoverable sleeve will depend on the length of bared cable that has to be bridged, and on the strength of seal required which will determine the length of sleeve that must bond to the jackets either side of the bared portion. The recovered diameter of the central part of the sleeve will generally be substantially equal to the cable diameter for a cable block, and will depend on the splice bundle for a cable splice. The size of the sleeve before recovery will depend on the largest part of the substrate the sleeve must pass over to allow assembly. Once these factors have been borne in mind one can calculate the volume of adhesive required as a fraction of the volume of the sleeve, either before or after recovery. Since the adhesive need not extend the entire length of the sleeve (the ends of the sleeve may be free of adhesive or have a thin coating sufficient only to bond them to the cable jacket) a more general characteristic is the ratio between cross-sectional area of the sleeve after recovery and the cross-sectional area of adhesive within it. The particulate adhesive need not be distributed uniformly within that part of the sleeve where it is present, and when it is not uniform this ratio can be regarded as an average. Preferred values for this ratio are A-B, more preferably C-D, especially E-F.

The assembly is preferably tubular and has a central portion of larger diameter which contains the particulate adhesive since in this way the channel through the centre of the assembly may be cylindrical. Alternatively, the sleeve may be a wrap-around sleeve comprising a sheet of recoverable material, closure means for maintaining it in a wrap-around configuration, and a particulate adhesive secured to one side by some mechanical means.

Of the three components of the assembly of the invention, the sleeve will be discussed first. It is preferably formed from a cross-linked polymeric material such as a modified polyolefin, and may be rendered heat-recoverable by any of the techniques mentioned above. The recovery termperature is preferably 115°-125° C., more preferably about 120° C., although this will depend on the adhesive used, the means for heating available, and on the susceptability of the cable to damage by heat. We prefer that the sleeve be substantially transparent in order that the installer can watch the progress of installation, although the presence of an external temperature indicator such as a thermochromic paint may render this feature unnecessary.

The adhesive used should be heat-activatable in order that installation can be carried out by the single step of heating. In general recovery and activation of the adhesive will both be accomplished by the use of, say, a propane torch, but separate heating means may be provided for the two components. We prefer that the particulate adhesive has a low activation temperature, and that it is closely matched to the recovery temperature of the sleeve. In this way quick installation and avoidance of cable damage may be ensured. A preferred heat-activatable adhesive is a hot-melt adhesive, although reactive systems and thermosetts may be used. An activation temperature from 65°-80° C. is preferred, 73°-77° C. being especially preferred. We prefer that the activation temperature of the adhesive is less than 55° C., more preferably less than 45° C., below the recovery temperature of the sleeve. In this way the adhesive will be properly activated by the time it is driven by the recovering sleeve into the core of the cable or around the cable splice. This feature is particularly useful where the adhesive melts on activation (this includes some reactive systems and thermosetts, as well as truely hot-melt adhesives) since it can then flow properly as the sleeve recovers.

The size of the particles of the adhesive is not critical, it being surprisingly found that the beneficial results of good adhesive activation and flow at low heat imput can be achieved over a wide range of particle size. The expected better heat conductivity of solid adhesive sheet would be thought to lead to more satisfactory heat-activation, since the ability of particles to move away from each other and the entrappment of air could delay proper activation; the explanation for the superior performance of particulate adhesive in these circumstances is not in fact fully understood.

Where the adhesive is a hot-melt adhesive the particles are preferably of an average diameter (if spherical) of 0.5–4 mm, more preferably 1–3 mm especially about 1.5 mm. A suitable hot-melt adhesive is a polyamide or a polyester based material, in particular a polyamide modified with a wax.

As an alternative to a hot-melt adhesive, one may use a powdered reactive component such as polyamide and an epoxy compound. This system allows for long shelf-life at one temperature and a very quick reaction time at a temperature only slightly higher.

Another factor which may influence choice of adhesive is its melt viscosity, and this will be more critical for cable blocking than for simple environmental protection of splices since in the former case penetration of the cable core is desirable. Preferred values are from 4–8, PA/sec more preferably from 5–7, PA/sec at a temperature from E-F, as measured by XYZ.

The third essential component is the mechanical means for maintaining the adhesive adjacent an inner surface of the sleeve. A balance must be attained here between the ability of the mechanical means to retain the integrity of the product before use without loss of adhesive, and the ease with which the adhesive can flow into a cable core or around a splice on installation. The situation is further complicated by the requirement that the adhesive become properly activated, since a premature flowing of adhesive would cause more heat ultimately to be required, possibly leading to cable damage. The following sequence of events is preferred: the sleeve is heated causing gradual activation of adhesive throughout its bulk, then the sleeve begins to recover and seals to the cables at its ends, the mechanical means fails, and recovery drives activated adhesive to the regions of the cable where it is wanted. This sequence is not essential since recovery can, at least to some extent, occur before activation, or failure of the mechanical means may occur earlier provided it does not lead to excessive loss of adhesive. The mechanical means preferably fails at a temperature from A-B, more preferably from C-D.

The mechanical means is preferably a net, although it need not be perforated, which traps the adhesive against an inner surface of the sleeve. The net may be made of a non-cross-linked polyolefin in order that it melts when the adhesive has been heated sufficiently for activation. The net conveniently is cylindrical and lies concentrically within the recoverable sleeve, closing an annular void within the sleeve resulting from the sleeve's non-uniform cross-sectional size (this is illustrated below). The sleeve may be moulded or otherwise formed with this shape, but it will generally be found more convenient to form a cylindrical sleeve, and expand its central region to a greater extent than its ends, or partially to recover its ends after uniform expansion. The net is preferably bonded to the sleeve, but it may simply be an interference fit within it. As an alternative, the net may entirely enclose the adhesive, and the bag of adhesive so formed be locatable within the sleeve. Reference to the mechanical means failing preferably means that it looses its structural integrity, especially by melting, but it may merely become disbonded or dislodged from the sleeve.

The product may include as a fourth component a further net which is installed directly around the cable and within the assembly of the other components. This further net will generally be discrete but it may be supplied affixed to the inside of the sleeve. Its purpose is to provide additional heat protection to the cable and it should therefore be heat resistant. A suitable material is a cross-linked polyethylene, which should be flexible so that the net can follow the surface of the cable, and be sufficiently perforate to allow passage of activated adhesive. As a further feature, the net may be coloured in order to provide a visual indication of when proper sealing has occured: at first this net will be invisible through the transparent sleeve due to the intervening particulate adhesive, but after activation and coalescence of the adhesive its colour will become visible.

The assembly of the invention may be used in conjuction with other components. In particular, where a cable splice is to be sealed, a branch-off can be effected by using a clip or a flexible seal (comprising a flexible envelope partially filled with a void-filling composition) as a means of forming at least two conduits at an end of the recoverable sleeve.

The invention will now be further illustrated with reference to the accompanying drawings in which:

FIG. 5 shows an assembly using a wrap-around, rather than tubular, sleeve; and

FIG. 6 shows an assembly where the adhesive is trapped in a bag.

Figure 1:
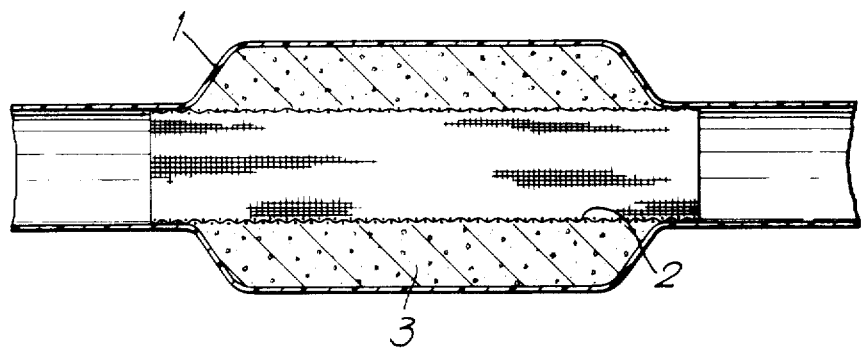
FIG. 1 shows an assembly of the invention.

FIG. 1 shows the basic assembly consisting of a recoverable sleeve 1 having an annular void resulting from the sleeve's non-uniform cross-sectional size. This annular void is closed by a mesh or net 2 and contains a particulate heat-activatable adhesive 3. For use with telecommunications distribution cables of up to, say, 100 pairs the recoverable sleeve preferably has an expanded diameter of 3.5-5.5 cm, especially about 4.5 cm, and a recovered diameter of from 1.5-2 cm, especially about 1.8 cm.

Figure 2:
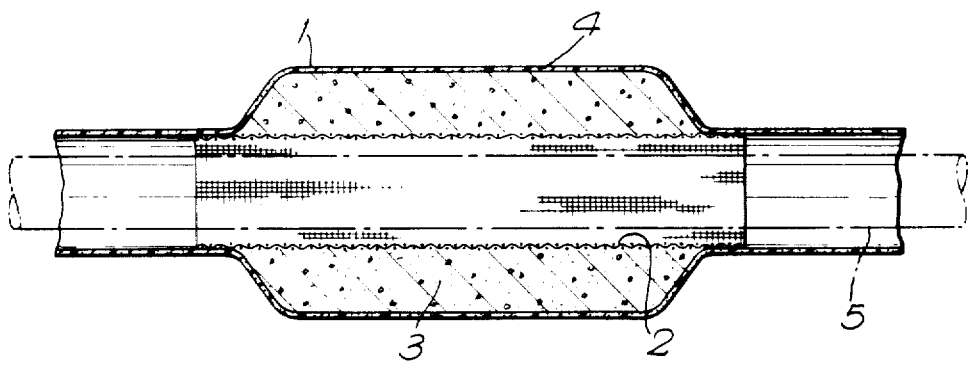
FIG. 2 shows a similar article together with a heat protective net.

FIG. 2 adds two further features: the sleeve 1 is coated on its internal surface with an adhesive or sealant coating 4, and an internal heat barrier net or mesh 2 is provided. The coating 4 need not extend the entire length of the sleeve (as shown) since it is primarily required at the ends of the sleeve for bonding to an underlying cable 5.

Figure 3:
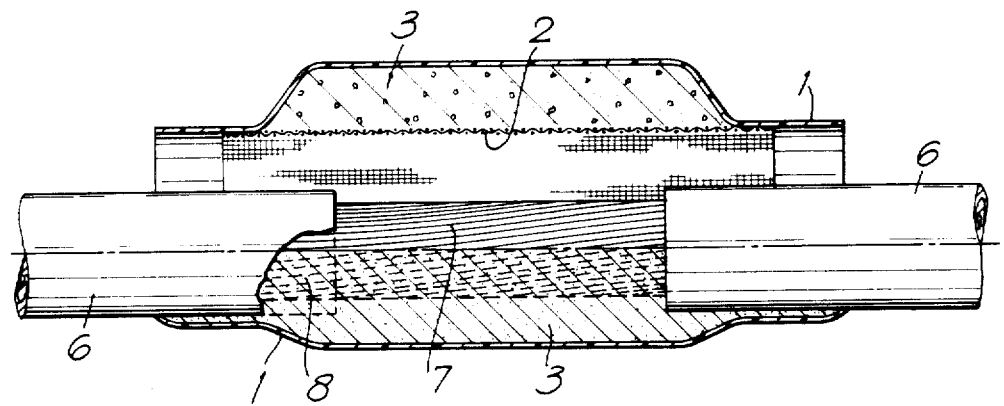
FIG. 3 shows the assembly used for forming a cable block.

The formation of a cable block is shown in FIG. 3: the upper half of the figure shows the assembly of the invention before heating, and the lower half shows the installed product. A portion of cable jacket has been removed from a cable 6 to expose its conductors 7. A cut-away at the left hand side of the figure shows the adhesive 3 having permeated the cable core to form a cable block 8.

Figure 4:
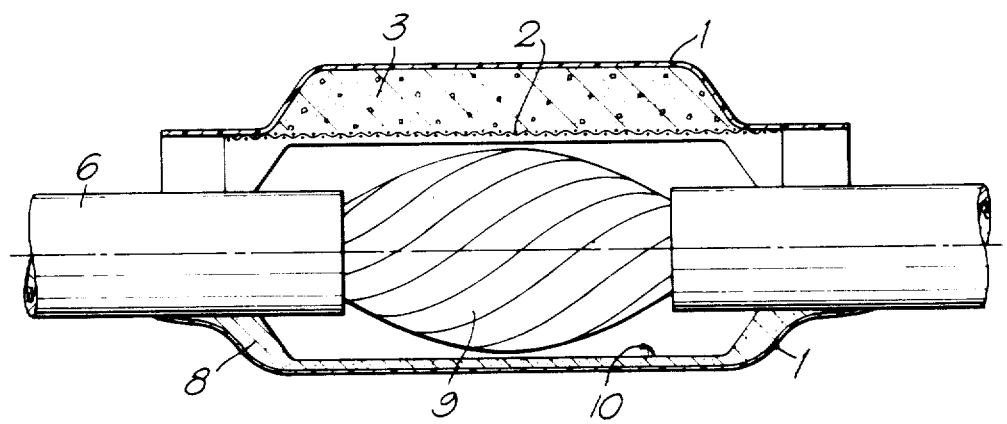
FIG. 4 shows the assembly used for sealing a cable splice.

A cable splice 9 is shown in FIG. 4, and again the figure is divided to show the situation before and after installation is complete. A liner 10 is positioned around the splice 9 to protect it mechanically and thermally from the outer sleeve during heat recovery. The liner has a larger central region to accommodate the splice and tapering end portions which provide a gentle transition to the cables. The liner 10 may be based, for example, on cardboard, a thermoplastics material or a metal such as aluminium. If the conductors are sufficiently rugged or the recovery temperature of the sleeve and activation temperature of the adhesive are sufficiently low the liner 10 could be omitted. The adhesive 3 would then be driven between the spliced conductors thereby sealing them from the environment. A disadvantage of this is that it makes re-entry difficult.

A wrap-around sleeve 1 having closure rails 11 is shown in FIG. 5. The closure rails may be held together by means of a C-shaped channel, or another closure mechanism or bonding may be used. The particulate adhesive 3 is held against the sleeve 1 by a net 2 which is bonded to the sleeve around its edges.

FIG. 6 illustrates an assembly in which the sleeve 1 is generally cylindrical and has the particulate adhesive 3 contained within a net bag 2 situated within the sleeve.

I claim:

1. An assembly for applying a heat-activatable adhesive to an elongate substrate, which comprises:
    a heat-recoverable driver sleeve;
    a particulate heat-activatable adhesive; and temporary restraining means for locating the adhesive adjacent an inner surface of the sleeve until heat-recovery of the sleeve.

2. An assembly according to claim 1, in which the sleeve has end regions of smaller cross-section and an intermediate region of larger cross-section, the particulate adhesive being located adjacent said intermediate region such that an internal passage through the assembly is substantially cylindrical.

3. An assembly according to claim 1, in which end regions of the sleeve are coated with an adhesive.

4. An assembly according to claim 1, in which the particulate adhesive is a hot-melt adhesive.

5. An assembly according to claim 1, in which the ratio between the cross-sectional area of the sleeve after recovery and the average cross-sectional area of particulate adhesive within it, taken over that length of the sleeve where the particulate adhesive is present, is from 2:1 to 3:1.

6. An assembly according to claim 1, in which the restraining means for locating the particulate adhesive is a net.

7. An assembly according to claim 6, in which the net is bonded to the sleeve.

8. An assembly according to claim 6, in which the net comprise a substantially non-cross-linked polyolefin.

9. An assembly according to claim 6, in which the net has a melting point below the recovery temperature of the sleeve.

10. An assembly according to claim 1, which additionally comprises a heat-resistant barrier which can surround the substrate inwardly of the sleeve and particulate adhesive.

11. An assembly according to claim 10, in which the barrier is a cross-linked polymeric net.

12. An assembly according to claim 10, in which the sleeve is substantially transparent and the barrier is coloured.

13. A method of producing a cable block, which comprises: surrounding a portion of the cable having a section thereof at least partially bare of jacket with an assembly according to claim 1; and heating the assembly to recover the sleeve and activate the adhesive, recovery causing the adhesive to be displaced from the temporary restraining means and driven into the core of the cable at the bared section thereof.

14. A method of sealing a cable splice, which comprises:
   surrounding a cable splice with an assembly according to claim 1; and
   heating the assembly to recover the sleeve and to activate the adhesive, recovery causing the adhesive to be displaced from the temporary restraining means and driven around the spliced conductors.

15. A method according to claim 14, in which on heating the following steps take place in sequence:
   (a) end portions of the sleeve recover into engagement with the cable jacket;
   (b) at least a part of the adhesive is activated;
   (c) the temporary restraining means becomes ineffective; and
   (d) the adhesive is displaced by recovery of a central portion of the sleeve.

* * * * *